(12) United States Patent
Sheem et al.

(10) Patent No.: US 9,793,064 B2
(45) Date of Patent: Oct. 17, 2017

(54) CRYSTALLINE CARBONACEOUS MATERIAL WITH CONTROLLED INTERLAYER SPACING AND METHOD OF PREPARING SAME

(75) Inventors: Kyeu-Yoon Sheem, Yongin-si (KR); Bok-Hyun Ka, Yongin-si (KR); Eui-Hwan Song, Yongin-si (KR); Jung-Woo An, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 804 days.

(21) Appl. No.: 12/952,105

(22) Filed: Nov. 22, 2010

(65) Prior Publication Data
US 2012/0009478 A1 Jan. 12, 2012

(30) Foreign Application Priority Data
Jul. 7, 2010 (KR) ........................ 10-2010-0065482

(51) Int. Cl.
| H01M 4/583 | (2010.01) |
| H01M 4/88 | (2006.01) |
| H01G 4/30 | (2006.01) |
| H01G 11/32 | (2013.01) |
| H01M 10/34 | (2006.01) |
| H01M 10/48 | (2006.01) |

(52) U.S. Cl.
CPC .......... *H01G 11/32* (2013.01); *H01M 10/345* (2013.01); *H01M 10/482* (2013.01); *Y02E 60/13* (2013.01)

(58) Field of Classification Search
None
See application file for complete search history.

(56) References Cited

U.S. PATENT DOCUMENTS

| 5,706,165 | A | 1/1998 | Saito et al. | |
| 7,288,342 | B2 * | 10/2007 | Ishii et al. | 429/231.8 |
| 2006/0035785 | A1 * | 2/2006 | Tanaka | 502/416 |
| 2006/0194088 | A1 | 8/2006 | Kabumoto | |
| 2006/0269802 | A1 * | 11/2006 | Yamaki et al. | 429/9 |

(Continued)

FOREIGN PATENT DOCUMENTS

| JP | 3882072 B2 | 2/2007 |
| JP | 3882072132 B2 | 2/2007 |

(Continued)

OTHER PUBLICATIONS

KIPO Office Action dated Nov. 15, 2011, for Korean Priority Patent Application No. 10-2010-0065482, 3 pages.

(Continued)

*Primary Examiner* — Barbara Gilliam
*Assistant Examiner* — Adam A Arciero
(74) *Attorney, Agent, or Firm* — Lewis Roca Rothgerber Christie LLP

(57) ABSTRACT

A crystalline carbonaceous material with a controlled interlayer spacing and a method of manufacturing the same. In one embodiment, a crystalline carbonaceous material has a layered structure including a plurality of layers and where a filler is present between the layers. The layers with the filler have an interlayer spacing d002 at a (002) plane, and the interlayer spacing d002 is at or between 0.335 nm and 1 nm when its X-ray diffraction is measured using a CuK$\alpha$ ray.

7 Claims, 1 Drawing Sheet

(56) References Cited

U.S. PATENT DOCUMENTS

| | | |
|---|---|---|
| 2007/0195488 A1 | 8/2007 | Kim et al. |
| 2007/0202372 A1 | 8/2007 | Kaburnoto |
| 2009/0126172 A1 | 5/2009 | Kobayashi et al. |

FOREIGN PATENT DOCUMENTS

| | | |
|---|---|---|
| KR | 10-2001-0082910 | 8/2001 |
| KR | 10-2006-0095487 | 8/2006 |
| KR | 10-2007-0066732 | 6/2007 |
| KR | 10-2007-0094721 | 9/2007 |
| KR | 10-2009-0027885 | 3/2009 |

OTHER PUBLICATIONS

Matsuo et al., "Preparation and characterization of pillared carbons obtained by pyrolysis of silylated graphite oxides", Carbon 47, (2009), pp. 804-811.

Matsuo, et al., "Introduction of amino groups into the interlayer space of graphite oxide using 3-aminopropylethoxysilanes", Carbon 45 (2007), pp. 1384-1390.

Wang, et al., "Surfactant-Mediated Synthesis of a Novel Nanoporous Carbon-Silica Composite", Chem. Mater. 2003, 15, pp. 2926-2935.

KIPO Office Action dated Jan. 20, 2012, for corresponding Korean Patent Application No. 10-2010-0065482, listing the cited references, as well as Carbon, Mar. 2009, vol. 47, which was previously cited in an IDS on Nov. 22, 2011, 5 pages.

Mitra and Sampath, "Electrochemical Capacitors Based on Exfoliated Graphite Electrodes," *Electrochemical and Solid-State Letters*, 7 (9) pp. A264-A268 (2004).

Kim et al., "Structures and electrochemical performances of pyrolized carbons from graphite oxides for electric double-layer capacitor," *Journal of Power Sources* 173, pp. 621-625 (2007).

* cited by examiner

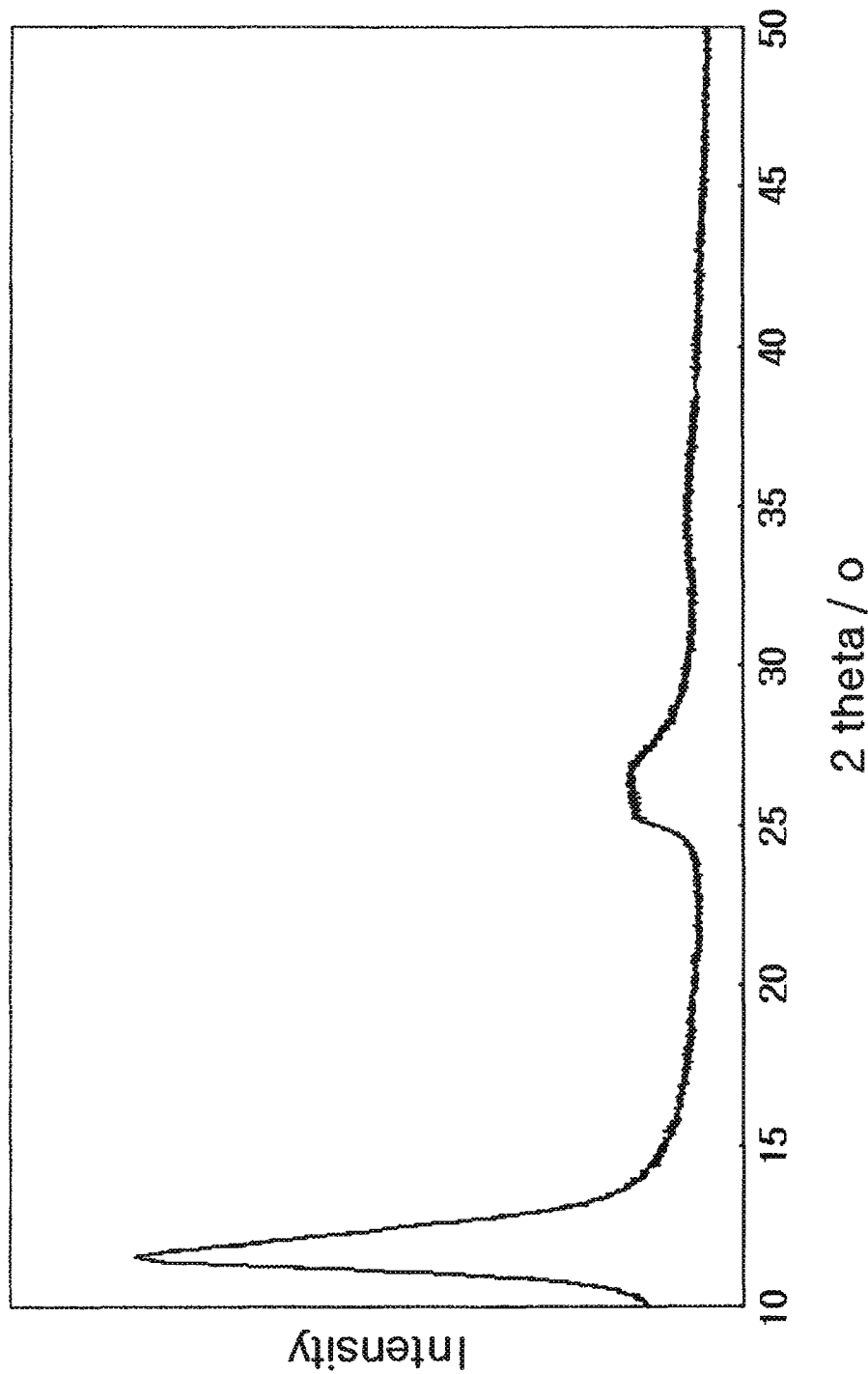

CRYSTALLINE CARBONACEOUS MATERIAL WITH CONTROLLED INTERLAYER SPACING AND METHOD OF PREPARING SAME

CROSS-REFERENCE TO RELATED APPLICATION

This application claims priority to and the benefit of Korean Patent Application No. 10-2010-0065482, filed in the Korean Intellectual Property Office on Jul. 7, 2010, the entire content of which is incorporated herein by reference.

BACKGROUND

1. Field

This following description relates to a crystalline carbonaceous material capable of providing controlled interlayer spacing, and a method of manufacturing the same.

2. Description of the Related Art

An energy storage device based on an electrochemical reaction includes two electrodes, an electrolyte that transfers ions, and a separation film. The electrochemical reaction of the energy storage device mostly occurs on the surface of an electrode, and is not a uniform reaction.

This electrochemical reaction can be classified as (1) a mass transfer reaction in which chemical species separated from an electrolyte are transferred to the surface of an electrode; (2) an absorption/desorption reaction (e.g., a non-faradaic reaction) in which the transferred chemical species form an electrical double layer; or (3) an electron transfer reaction (e.g., a faradaic reaction).

Herein, the reaction species may have a non-faradaic reaction in which the chemical species from the electrolyte form an electrical double layer on the electrode surface and they are desorbed, or a faradaic reaction in which they are directly provided with electrons and oxidized (or reduced).

One or more of the above described electrochemical reactions, e.g., the non-faradaic reaction may be representatively used in an energy storage device such as a super capacitor (referred to as an electrical double layer capacitor).

The super capacitor can have increased capacity by increasing the surface area of its active material. Accordingly, there is much research on increasing the surface area of an active material, for example, U.S. Pat. No. 5,706,165 and Korean Patent Laid-open No. 2006-095487, and the entire contents of both of which are incorporated herein by reference. However, many attempts are still being made to increase the surface area of an active material.

SUMMARY

An aspect of an embodiment of the present invention is directed toward a crystalline carbonaceous material having high capacity.

An aspect of an embodiment of the present invention is directed toward a method of manufacturing the crystalline carbonaceous material.

According to one embodiment of the present invention, a crystalline carbonaceous material with a controlled interlayer spacing is provided that has a layered structure where a filler is present between the layers, and has an interlayer spacing d002 at a (002) plane of about 0.335 nm to about 1 nm when its X-ray diffraction is measured using a CuKα ray.

The interlayer spacing d002 is in a range of about 0.337 nm or more and about 1 nm or less, or about 0.35 nm or more and about 0.8 nm or less.

The carbonaceous material has a peak at $2\theta=26.5°\pm0.5°$ and $2\theta=18.0°\pm8.0°$ when its X-ray diffraction is measured using a CuKα ray.

The filler may be a polymer including Si, S, Al, N, or a combination thereof; or a compound including Si, S, Al, N, or a combination thereof. The filler may include $SiO_2$, $SO_3$, $Al_2O_3$, silane, or a combination thereof.

The crystalline carbonaceous material may be applicable to a capacitor or a rechargeable lithium battery.

According to another embodiment of the present invention, a method of manufacturing a carbonaceous material with a controlled interlayer spacing is provided that includes: contacting crystalline carbon with a filler precursor; primarily heat-treating the crystalline carbon contacted with the filler precursor under vacuum by increasing a temperature at an increasing speed ranging from about 0.3° C./min to about 5.0° C./min to a temperature ranging from about 150° C. to about 250° C.; and secondarily heat-treating the resulting product under an inert atmosphere by increasing a temperature at an increasing speed of about 1.0° C./min to about 10.0° C./min to a temperature ranging from about 250° C. to about 900° C. and maintaining it at the temperature.

The crystalline carbon may be contacted with the filler precursor for about 1 hour to about 100 hours.

The filler precursor may be used in a liquid or gas form. When the filler precursor is liquid, it may further include a process of oxidizing the crystalline carbon before contacting the crystalline carbon with the filler precursor. The oxidation process includes adding an oxidizing agent into a mixture of crystalline carbon and acid, and drying the oxidized crystalline carbon.

According to one embodiment of the present invention, a crystalline carbonaceous material with a controlled interlayer spacing can provide a capacitor having improved capacity.

BRIEF DESCRIPTION OF THE DRAWING

The accompanying FIGURE is a graph showing X-ray diffraction results of a carbonaceous material according to Example 1, which is measured using a CuKα ray.

DETAILED DESCRIPTION

Exemplary embodiments of this disclosure will hereinafter be described in detail. However, these embodiments are only exemplary, and this disclosure is not limited thereto.

The crystalline carbonaceous material with a controlled interlayer spacing according to one embodiment has a layered structure including a plurality of layers where a filler is present between the layers, and the layers with the filler have an interlayer spacing d002 at a (002) plane (e.g., a (002) crystal plane), and the interlayer spacing d002 is at or between 0.335 nm and 1 nm (or of about 0.335 nm to about 1 nm) when its X-ray diffraction is measured using a CuKα ray.

In one embodiment, the interlayer spacing d002 is from about 0.337 nm to about 1 nm. In one embodiment, the interlayer spacing d002 is from about 0.35 nm to about 0.8 nm.

In one embodiment, when the crystalline carbonaceous material has an interlayer spacing d002 within the range, it is easy to intercalate cations and anions into the carbonaceous material to show a high power characteristic. In one embodiment, when the interlayer spacing is more than 1 nm, the layers are all separated and the layered structure is broken, so that the material property of the layered structure is lost. Also, in another embodiment, when the interlayer spacing is less than 0.335 nm, the inserting of cations and anions between the interlayers of the carbonaceous material is physically resisted.

The crystalline carbon may include natural graphite, artificial graphite, mesophase carbon microbeads, or a combination thereof. Here, artificial graphite is used to refer to artificial graphite obtained by heating soft carbon at a high temperature of about 2500° C. or higher.

The crystalline carbonaceous material may have peaks shown at $2\theta=26.5°±0.5°$ and $2\theta=18.0°±8.0°$ when its X-ray diffraction is measured using a CuKα ray. For example, it may have one peak at $2\theta=26.5°±0.5°$ and one peak at $2\theta=18.0°±8.0°$.

The filler may be disposed between the layers of a crystalline carbonaceous material having a layered structure to increase the interlayer spacing and to maintain the interlayer spacing. Examples of fillers includes a polymer including Si, S, Al, N, or a combination thereof, or a compound including Si, S, Al, N, or a combination thereof.

Examples of the filler may include $SiO_2$, $SO_3$, $Al_2O_3$, silane, or a combination thereof.

In one embodiment, the filler is included at or between 5 wt % and 30 wt % based on the total weight of crystalline carbonaceous material. In one embodiment, when the filler is included within the above described wt % range, it increases and maintains the interlayer spacing at a desirable level while not deteriorating the conductivity of the crystalline carbonaceous material.

In embodiments of the present invention, the crystalline carbonaceous material is applicable to or for a capacitor or a rechargeable lithium battery.

In one embodiment, when the carbonaceous material has an interplanar spacing d002 within the above described range, cations and anions of an electrolytic salt of an electrolyte used in a capacitor or a rechargeable lithium battery is not only easily absorbed and desorbed among the layers therein, but is also intercalated/deintercalated despite not applying a high voltage. Accordingly, when the carbonaceous material is used in a capacitor or a rechargeable lithium battery, capacity may be improved. Additionally, the carbonaceous material may solve the decomposition problem of an electrolyte in a rechargeable lithium battery even when applied with a high voltage by using ion intercalation/deintercalation among layers of the carbonaceous material in the rechargeable lithium battery.

In addition, since the carbonaceous material with controlled interlayer spacing is crystalline according to one embodiment of the present invention, it has fewer cavities than amorphous carbon and thus has relatively high conductivity. Accordingly, since the carbonaceous material has interlayer spacing for absorbing/desorbing desolvated ions while still having relatively high conductivity, it has the desired diffusion characteristics.

According to one embodiment of the present invention, the carbonaceous material has a specific surface area at or between 5 $m^2/g$ and 100 $m^2/g$ (or in a range from about 5 $m^2/g$ to about 100 $m^2/g$). In one embodiment, when the specific surface area falls within the above range, an electrolyte decomposition reaction is reduced or minimized.

In addition, the carbonaceous material according to one embodiment of the present invention has a tap density in a range from about 0.5 g/cc to about 1.5 g/cc.

The carbonaceous material with a controlled interlayer spacing according to one embodiment has a high tap density that is sufficient to improve its energy density, and also maintains the interlayer spacing at more than the ion diameter of lithium salt of the electrolyte so that it is enough to absorb desolvated ions and to maintain the ions adsorbed on its surface walls.

The carbonaceous material with a controlled spacing according to one embodiment may be used as an electrode material for an energy storage device such as a rechargeable lithium battery or a capacitor. For example, when it is used in a rechargeable lithium battery, it is applicable to a negative active material; or when it is used in a capacitor, it is applicable to both a symmetric and asymmetric capacitor.

Another embodiment of the present invention provides a method of manufacturing a carbonaceous material with a controlled interlayer spacing. The method includes: contacting crystalline carbon with a filler precursor; primarily heat-treating the crystalline carbon contacted with the filler precursor under vacuum with a first temperate increasing speed at or between 0.3° C./min and 5.0° C./min (or in a range from about 0.3° C./min to about 5.0° C./min) to a first temperature at or between 150° C. and 250° C. (or in a range from about 150° C. to about 250° C.); and secondarily heat-treating the resulting product under an inert atmosphere with a second temperature increasing speed at or between 1.0° C./min and 10.0° C./min (or in a range from about 1.0° C./min to about 10.0° C./min) to a second temperature at or between 250° C. and 900° C. (or in a range from about 250° C. to about 900° C.) and maintaining the second temperature.

Hereinafter, an embodiment of the present invention is described according to each of its manufacturing steps in more detail.

Primarily, crystalline carbon is contacted with a filler precursor. The crystalline carbon is contacted with the filler precursor for a time period at or between 1 hour and 100 hours (or about 1 hour to about 100 hours).

Examples of the filler precursor may include a gas including S, N, F, or a combination thereof; a solution including S, N, F, or a combination; a monomer including carbon and Si, S, N, F, or a combination thereof; a polymer including carbon and Si, S, N, F, or a combination thereof; or a combination thereof. Examples of the filler precursor may include silanes such as tetraethylorthosilicate, tetra methylorthosilicate, or a combination thereof; metal oxyfluorides such as TiF, $NbF_5$, $WF_6$, $MoF_6$, $VOF_3$, or a combination thereof; $CaC_6$; or $SO_3$; or a combination thereof.

As mentioned above, the filler precursor may be used in a liquid, gas, or solid form.

In the case of the liquid filler precursor, the solvent may include an alcohol such as ethanol, methanol, isopropyl alcohol, butanol, or a combination thereof. The liquid filler precursor may have a concentration ranging from 10 wt % to 50 wt %, but it may be appropriately controlled according to the contact time or the like.

In addition, in the case of the liquid filler precursor, the crystalline carbon is further oxidized before contacting the filler precursor.

The oxidation process may be performed by adding an oxidizing agent to a mixture of crystalline carbon and acid to oxidize the same. The mixture of crystalline carbon and acid may be prepared by adding the acid to the crystalline carbon. Herein, the crystalline carbon may include natural graphite, artificial graphite, mesophase carbon microbeads, or a combination thereof. The artificial graphite is soft carbon acquired through heat treatment at 2500° C. or higher.

The acid may include $H_2SO_4$, $HNO_3$, $H_3PO_4$, $H_4P_2O_7$, $H_3AsO_4$, HF, $H_2SeO_4$, $HClO_4$, $CF_3COOH$, $BF_3(CH_3COOH)_2$, $HSO_3F$, $H_5IO_6$, or a combination thereof.

The crystalline carbon and acid are mixed in a ratio ranging from 1:15 to 1:100. The oxidizing agent may include $KMnO_4$, $NaNO_3$, $KClO_3$, $NaClO_3$, $NH_4ClO_3$, $AgClO_3$, $HClO_3$, $NaClO_4$, $NH_4ClO_4$, $CrO_3$, $(NH_4)_2S_2O_8$, $PbO_2$, $MnO_2$, $As_2O_5$, $Na_2O_2$, $H_2O_2$, $N_2O_5$, or a combination thereof.

In one embodiment, the oxidizing agent is added to the mixture once in an amount at or between 50 parts by weight and 750 parts by weight (or from about 50 parts by weight to about 750 parts by weight) based on 100 parts by weight of the crystalline carbon.

When the oxidizing agent is added to the mixture, the crystalline carbon is oxidized. The resulting mixture is allowed to stand for better oxidation for about 1 day to about 10 days.

Next, the oxidized crystalline carbon is dried. The drying may be performed by separating the oxidized crystalline carbon from the acid and the oxidizing agent and then washing it to improve purity in a shorter time. The drying may be performed at a temperature in a range from about 100° C. to about 150° C. The drying is performed for a sufficient or suitable time period to remove moisture from the oxidized crystalline carbon.

As described above, the product obtained by contacting the crystalline carbon or the selectively-oxidized crystalline carbon with the filler precursor is heated. Hereinafter, the heat treatment is described in more detail.

Then the product is primarily heat-treated under vacuum with a temperature increasing speed in a range from about 0.3° C./min to about 5.0° C./min to a temperature in a range from about 150° C. to about 250° C.

In one embodiment, the vacuum degree is at or between 0.01 mbar and 0.1 mbar (or in a range from about 0.01 mbar to about 0.1 mbar). In one embodiment, when the primarily heat treatment is performed under the above vacuum degree, the gas generated from the heat treatment is more rapidly removed, so it is easy to control the interlayers of crystalline carbon.

The primarily heat treatment may be performed for 0.5 to 12 hours.

The primarily heat-treated product is secondarily heat-treated under an inert atmosphere with a temperature increasing speed in a range from about 1.0° C./min to about 10.0° C./min to a temperature (i.e., a second temperature) in a range from about 250° C. to about 900° C.

In one embodiment, the second temperature is maintained for a time period at or between 1 hour and 48 hours (or for about 1 hour to about 48 hours).

The inert atmosphere may include nitrogen, argon, or a combination thereof.

When the heat treatment is performed by slowly increasing a temperature at a set or predetermined heating speed, the acid and the oxidizing agent among the formed layers may be released at a low speed to thereby result in preparing a material with high density. In other words, when the heat treatment is performed with an extremely fast temperature increasing speed to a high temperature (e.g., 900° C.), acid and an oxidizing agent may be instantly released as gas. Since a crystalline carbonaceous material (with the extremely fast temperature increasing speed) may have severely expanded interlayer spacing and may be partly broken, it may have an improved surface area but a sharply decreased density. Accordingly, the crystalline carbonaceous material may have a problem of less absorption per unit volume. However, this problem may be prevented by the method according to one embodiment of the present invention.

Furthermore, the method according to one embodiment of the present invention may provide a carbonaceous material with excellent conductivity by developing a graphite layer therein through a non-uniform reaction. The carbonaceous material layer may include a graphite layer including both a perfect graphite crystal layer and an expanded gap between the layers (2 phases). When the double-phased crystalline composite graphite is prepared by effectively controlling the interlayer spacing of graphite, two significant peaks are shown at $2\theta=26.5°\pm0.5°$ and $2\theta=18.0°\pm8.0°$ measured through XRD diffraction using a CuKα ray. Particularly, it may have one peak at $2\theta=26.5°\pm0.5°$ and one peak at $2\theta=18.0°\pm8.0°$.

The capacitor or rechargeable lithium battery including a carbonaceous material with a controlled interlayer spacing according to one embodiment includes an electrolyte. The rechargeable lithium battery may include any suitable positive active material as long as it is a lithium intercalation compound. In addition, when the carbonaceous material is used for an asymmetric capacitor, the electrode material for the counter electrode may include any suitable carbonaceous material.

Herein, the electrolyte may include a solvent, cations, and anions.

The solvent may include propylene carbonate, ethylene carbonate, dimethyl carbonate, diethyl carbonate, ethylmethyl carbonate, 1,2-butylene carbonate, sulfolane, acetonitrile, γ-butyrolactone, dimethyl ether, diethyl ether, tetrahydrofuran, or a combination thereof.

The cation may include tetramethyl ammonium, ethyltrimethyl ammonium, diethyldimethyl ammonium, triethylmethyl ammonium, tetraethyl ammonium, dimethylpyrrolidium, ethylmethylpyrrolidium, piperidine-spiro-plyrolidium, spiro-bipiperidinium, 1-ethyl-3-methyl-imidazolium, 1,2-dimethyl-3-propylimidazolium, 1,2-diethyl-3,5-dimethylimidazolium, trimethyl-n-hexyl ammonium, N-butyl-N-methylpyrrolidium, N-methyl-N-propylpiperidinium, N-ethyl-N-methylmorpholinium, or a combination thereof.

The anion may include $BF_4^-$, $PF_6^-$, $ClO_4^-$, $AsF_6^-$, trifluoromethane sulfonate, bis(trifluoromethanesulfonyl)imide, bis(pentafluoroethanesulfonyl)imide, bis(fluorosulfonyl)imide, 2,2,2-trifluoro-N-(trifluoromethanesulfonyl)acetamide, pentafluoroethane trifluoroborate, tri(pentafluoroethane)trifluorophosphate, or a combination thereof.

These cations and anions have a size in a range from about 0.20 nm to about 0.45 nm and thus is well diffused, i.e., inserted into layers of a carbonaceous material with interlayer spacing in a range from about 0.335 nm to about 1 nm according to one embodiment of the present invention.

The following examples illustrate this disclosure in more detail. However, the following are exemplary embodiments and are not limiting.

EXAMPLE 1

Mesophase carbon microbeads (MCMB, artificial graphite (obtained by heating soft carbon at 2800° C.)) are mixed with acid.

The acid is prepared by mixing concentrated sulfuric acid (98 volume % concentration) and nitric acid (63 volume % concentration) in a volume ratio of 1:3. The MCMB is mixed with the acid in a mixing ratio of 1:27 wt %.

An oxidizing agent of potassium permanganate is added into the mixture. The potassium permanganate is added at 500 parts by weight based on 100 parts by weight of MCMB.

Then the obtained product is allowed to stand for 48 hours. At this time, the sulfuric acid is inserted into the MCMB interlayer structure, so the MCMB is oxidized.

After the reaction, the product is filtered to obtain the oxidized MCMB and washed with distilled water to be neutral.

The obtained product is sufficiently dried at 120° C. in a drying oven to remove the moisture. The obtained oxidized MCMB is placed in a tetraethyl orthosilicate solution (solvent: anhydrous ethylalcohol) to have a concentration of 20 wt % and agitated for 12 hours.

The obtained precipitate is filtrated and again washed to provide neutral pH. The washed product is sufficiently dried at 120° C. in a drying oven to remove the moisture.

The obtained materials are introduced into a furnace and primarily heat treated by increasing a temperature to 150° C. with a temperature increasing speed of 2° C./min while maintaining vacuum of 0.03 mbr. While injecting nitrogen at 10 mL/min, the primarily heat-treated product is secondarily heat-treated by increasing a temperature to 500° C. with a temperature increasing speed of 5° C./min or less and maintained for 12 hours.

According to the process, a crystalline carbonaceous material with a controlled interlayer spacing may be provided. In addition, the crystalline carbonaceous material includes a silica ($SiO_2$) filler between the layers, and the filler is included at 5 wt % based on the total weight of crystalline carbonaceous material.

The crystalline carbonaceous material obtained from Example 1 is measured for X-ray diffraction using a CuKα ray, and the results are shown in FIGURE. As shown in FIGURE, the crystalline carbonaceous material obtained from Example 1 shows two peaks at 2θ=about 12° and about 26°. From the results, it is understood that the interlayer spacing is effectively controlled in the carbonaceous material obtained from Example 1.

EXAMPLE 2

A crystalline carbonaceous material with a controlled interlayer spacing is fabricated in accordance with the same procedure as in Example 1, except that the primarily heat-treated product is secondarily heat-treated by increasing a temperature to 700° C. with a temperature increasing speed of 5° C./min or less and maintained at the temperature for 12 hours while injecting nitrogen at 10 mL/min.

EXAMPLE 3

Oleum, (fuming sulfuric acid) is sufficiently injected into a round flask and connected to a flask charged with natural graphite powders with the injection hole. A ceramic separation layer is connected therebetween to prevent mixing between the graphite powder and oleum. The flask injected with oleum is heated to 80° C. or higher to generate $SO_3$ gas, and the generated $SO_3$ gas is passed through the flask charged with the natural graphite powder and then discharged.

The reaction is maintained for 20 hours to induce the $SO_3$ gas to be intercalated into the natural graphite interlayer and to be reacted.

The reacted product is allowed to stand at room temperature under vacuum of 0.1 mbr for 48 hours. Then the obtained product is filtered to obtain powder, and the powder is primarily heat-treated by increasing a temperature to 150° C. with a temperature increasing speed of 2° C./min while maintaining a vacuum state of 0.05 mbr. The primarily heat-treated product is secondarily heat-treated by increasing a temperature to 500° C. with a temperature increasing speed of 5° C./min or less for 12 hours and maintained for 12 hours while injecting nitrogen at 10 mL/min.

According to the process, a crystalline carbonaceous material with a controlled interlayer spacing is provided. In addition, the crystalline carbonaceous material includes a sulfur oxide ($SO_3$) filler between the layers, and the filler is included at 30 wt % based on the crystalline carbonaceous material.

EXAMPLE 4

A crystalline carbonaceous material with a controlled interlayer spacing is fabricated in the same procedure as in Example 3, except that the primarily heat-treated product is secondarily heat-treated by increasing a temperature to 700° C. with a temperature increasing speed of 5° C./min or less and maintained at the temperature for 12 hours while injecting nitrogen at 10 mL/min.

EXAMPLES 5 to 8

Each crystalline carbonaceous material obtained from Examples 1 to 4 as an active material, and carbon black as a conductive material are added with polyvinylidene fluoride as a binder dissolved in a N-methylpyrrolidone solvent to provide an active material slurry. The crystalline carbonaceous material, the conductive material, and the binder are included at 85 wt %, 5 wt %, and 10 wt %, respectively.

The active material slurry is coated on an aluminum current collector and sufficiently dried in an oven at 120° C. to provide an electrode. The electrode is cut to a size of 2 $cm^2$ to provide a symmetric capacitor having an electrolyte solution in which 1 mole of $Et_4NBF_4$ ($Et_4N$: tetra ethylammonium) is dissolved in a propylene carbonate solvent. The symmetric capacitor is charged and discharged step-by-step to 0.5 $mA/cm^2$ and 10 $mA/cm^2$ to determine the capacity and output.

COMPARATIVE EXAMPLE 1

A symmetric capacitor is fabricated in accordance with the same procedure as in Example 5, except that the electrode includes active carbon as an active material.

COMPARATIVE EXAMPLE 2

A symmetric capacitor is fabricated in accordance with the same procedure as in Example 5, except that the electrode includes an expanded graphite obtained by exposing oxidized graphite at 900° C. as an active material.

The carbonaceous materials obtained from Examples 1 to 4 and the expanded graphite used for Comparative Example 2 are measured for physical properties, and the results are shown in the following Table 1.

TABLE 1

Material Characteristics of Carbonaceous Material
with a Controlled Interlayer Spacing Using Filler

| | Carbonaceous material | Heat treatment temperature (° C.) | Interlayer spacing d002 (nm) | Tap density (g/cm$^3$) | Specific surface area (m$^2$/g) |
|---|---|---|---|---|---|
| Example 1 | Carbonaceous material with a controlled interlayer spacing | 500 | 0.524 | 0.91 | 39.4 |
| Example 2 | Carbonaceous material with a controlled interlayer spacing | 700 | 0.681 | 0.83 | 50.2 |
| Example 3 | Carbonaceous material with a controlled interlayer spacing | 500 | 0.687 | 0.85 | 51.6 |
| Example 4 | Carbonaceous material with a controlled interlayer spacing | 700 | 0.489 | 0.93 | 42.1 |
| Comparative Example 2 | Expanded graphite | 900 | 0.336 | 0.03 | 213 |

As shown in Table 1, the expanded graphite of Comparative Example 2 obtained by rapidly exposing the oxidized graphite at a high temperature has a physically-foamed structure between the layered structure, so that the specific surface area thereof is higher than those according to Examples 1 to 4. However, it is still less than the specific surface area of active carbon (specific surface area: 1500 m$^2$/g or more), and the tap density is extremely decreased to 0.03 g/cm$^3$ due to the foamed structure obtained by the damaged interlayer structure.

Each crystalline carbonaceous material according to Examples 1 to 4 is obtained by using a filler, and the filler is reduced between the graphite layers and inserted between the layers to act as a kind of column, so that the filler physically enlarges the graphite interlayers that are connected by Van der Waals forces. As shown in Table 1, the interlayer spacing is enlarged, so the tap density and the specific surface area are well maintained at an appropriate level. The expanded interlayer spacing helps ions having different diameters to easily enter into the interlayers, and the density that is higher than the expanded graphite or the active carbon may contribute to enhance the capacity of a device through fabricating a dense electrode plate.

Each symmetric capacitor obtained from Examples 5 to 8 and Comparative Examples 1 to 2 is measured for capacitance and resistance, and the results are shown in the following Table 2.

TABLE 2

Material Characteristics of Carbonaceous Material with Controlled Interlayer Spacing Using Filler

| | Carbonaceous material | Heat treatment temperature (° C.) | Voltage at a start of an intercalation (V) | Capacitance (F/g) (applied current density: 0.5 mA/cm2) | Capacitance (F/g) (applied current density: 105 mA/cm2) | Resistance (n, 1 KHz) |
|---|---|---|---|---|---|---|
| Example 5 | Example 1 (carbonaceous material with a controlled interlayer spacing) | 500 | 3.2 | 25 | 22 | 0.39 |
| Example 6 | Example 2 (carbonaceous material with a controlled interlayer spacing) | 700 | 3.1 | 29 | 24 | 0.38 |
| Example 7 | Example 3 (carbonaceous material with a controlled interlayer spacing) | 500 | 3.2 | 28 | 25 | 0.41 |
| Example 8 | Example 4 (carbonaceous material with a controlled interlayer spacing) | 700 | 3.1 | 24 | 23 | 0.39 |
| Comparative Example 1 | | — | — | 20 | 10 | 0.53 |
| Comparative Example 2 | | 900 | 3.9 | 17 | 10 | 0.63 |

As shown in Table 2, it is understood that each carbonaceous material with a controlled interlayer spacing obtained by doping a filler according to Examples 5 to 8 has a lower (rapider) voltage at start of intercalation than that according to Comparative Example 2. The lower voltage at start of intercalation means that the internal resistance is lower, and it is clear that each of Examples 5 to 8 has lower resistance than Comparative Example 2 when the resistance is measured at 1 KHz.

The lower active material resistance is confirmed by the less damage in the crystal structure of graphite, which is determined by the capacitance when applying a current to a device. In other words, the huge difference is monitored by comparing the electrochemical reactions when suddenly applying a large current of 0.5 mA/cm². As shown in Table 2, Comparative Example 2 shows low capacitance of about 10 F/g, but Examples 5 to 8 using the carbonaceous material with a controlled interlayer spacing using a filler show improved capacitance by 50% or more.

While this disclosure has been described in connection with what is presently considered to be practical exemplary embodiments, it is to be understood that this disclosure is not limited to the disclosed embodiments, but, on the contrary, is intended to cover various modifications and equivalent arrangements included within the spirit and scope of the appended claims. Therefore, the above-mentioned embodiments are exemplary but do not limit in any sense.

What is claimed is:

1. A crystalline carbonaceous material comprising:
   a layered structure comprising a plurality of layers; and
   a filler between the layers,
   wherein the plurality of layers with the filler therebetween have an interlayer spacing d002 at a (002) plane, and the interlayer spacing d002 is at or between 0.489 nm and 1 nm when its X-ray diffraction is measured using a CuKα ray,
   wherein the crystalline carbonaceous material is a natural graphite, an artificial graphite, mesophase carbon microbeads, or a combination thereof, and
   wherein the crystalline carbonaceous material has a specific surface area at or between 39.4 m²/g and 51.6 m²/g, and shows peaks at 2Θ=26.5°±0.5° and 2θ=12.0°±2.0°.

2. The crystalline carbonaceous material of claim 1, wherein the filler is a polymer comprising Si, S, Al, N, or a combination thereof or is a compound comprising Si, S, Al, N, or a combination thereof.

3. The crystalline carbonaceous material of claim 1, wherein the filler comprises $SiO_2$, $SO_3$, $Al_2O_3$, silane, or a combination thereof.

4. The crystalline carbonaceous material of claim 1, wherein the filler is included at or between 5 wt % and 30 wt % based on the total weight of the crystalline carbonaceous material.

5. The crystalline carbonaceous material of claim 1, wherein the crystalline carbonaceous material is for a capacitor or a rechargeable lithium battery.

6. The crystalline carbonaceous material of claim 1, wherein the crystalline carbonaceous material has a tap density at or between 0.5 g/cc and 1.5 g/cc.

7. A crystalline carbonaceous material comprising:
   a layered structure comprising a plurality of layers; and
   a filler between the layers,
   wherein the plurality of layers with the filler therebetween have an interlayer spacing d002 at a (002) plane, and the interlayer spacing d002 is at or between 0.337 nm and 1 nm when its X-ray diffraction is measured using a CuKα ray,
   wherein the filler is a polymer comprising Si, S, Al, N, or a combination thereof or is a compound comprising Si, S, Al, N, or a combination thereof, the filler being included at or between 5 wt % and 30 wt % based on the total weight of the crystalline carbonaceous material,
   wherein the crystalline carbonaceous material is a natural graphite, an artificial graphite, mesophase carbon microbeads, or a combination thereof, and
   wherein the crystalline carbonaceous material has a specific surface area at or between 39.4 m²/g and 51.6 m²/g and a tap density at or between 0.5 g/cc and 1.5 g/cc, and shows peaks at 2Θ=26.5° and 2θ=12.0°±2.0°.

* * * * *